US007801755B2

(12) United States Patent
Doherty et al.

(10) Patent No.: US 7,801,755 B2
(45) Date of Patent: Sep. 21, 2010

(54) MANAGEMENT HIERARCHY FOR ENTERPRISE APPLICATIONS AND METHODS AND SYSTEMS FOR GENERATING REPORTS USING SAME

(75) Inventors: Kristen Doherty, Menlo Park, CA (US); Kurt G. Robson, Foster City, CA (US); Lars Martinsson, Redwood City, CA (US)

(73) Assignee: Oracle Inernational Corporation, Redwood Shores, CA (US)

( * ) Notice: Subject to any disclaimer, the term of this patent is extended or adjusted under 35 U.S.C. 154(b) by 1009 days.

(21) Appl. No.: 11/127,870

(22) Filed: May 11, 2005

(65) Prior Publication Data

US 2006/0259340 A1 Nov. 16, 2006

(51) Int. Cl.
*G06F 15/02* (2006.01)
(52) U.S. Cl. .................. 705/9; 705/7; 705/8; 715/765; 715/853; 707/600; 345/440
(58) Field of Classification Search ............... 705/7–10; 715/853, 765; 707/100, 104.1, 2, 200, 600; 345/440
See application file for complete search history.

(56) References Cited

U.S. PATENT DOCUMENTS

| 4,555,771 | A | * | 11/1985 | Hayashi | 707/1 |
|---|---|---|---|---|---|
| 4,613,946 | A | * | 9/1986 | Forman | 715/853 |
| 4,764,867 | A | * | 8/1988 | Hess | 715/853 |
| 5,247,666 | A | * | 9/1993 | Buckwold | 707/100 |
| 5,257,365 | A | * | 10/1993 | Powers et al. | 1/1 |
| 5,467,440 | A | * | 11/1995 | Nihei | 345/440 |
| 5,644,740 | A | * | 7/1997 | Kiuchi | 715/853 |
| 5,786,820 | A | * | 7/1998 | Robertson | 715/853 |
| 6,252,597 | B1 | * | 6/2001 | Lokuge | 715/841 |
| 6,259,458 | B1 | * | 7/2001 | Theisen et al. | 345/440 |
| 6,285,366 | B1 | * | 9/2001 | Ng et al. | 715/853 |
| 6,308,163 | B1 | * | 10/2001 | Du et al. | 705/8 |
| 6,505,183 | B1 | | 1/2003 | Loofbourrow et al. | |
| 6,947,950 | B2 | * | 9/2005 | Murthy et al. | 707/103 R |
| 6,947,951 | B1 | * | 9/2005 | Gill | 707/104.1 |
| 6,965,903 | B1 | * | 11/2005 | Agarwal et al. | 707/104.1 |
| 6,975,999 | B2 | * | 12/2005 | Moore | 705/9 |
| 6,980,985 | B1 | * | 12/2005 | Amer-Yahia et al. | 707/4 |
| 6,983,288 | B1 | * | 1/2006 | Kirkwood et al. | 707/103 R |
| 7,069,266 | B2 | * | 6/2006 | Calderaro et al. | 707/783 |
| 7,082,404 | B2 | * | 7/2006 | Calderaro et al. | 705/11 |
| 7,330,822 | B1 | * | 2/2008 | Robson et al. | 705/9 |

(Continued)

OTHER PUBLICATIONS www.analytictech.com/mb021/departme.htm, archived Apr. 9, 2004.*

(Continued)

*Primary Examiner*—Romain Jeanty
*Assistant Examiner*—Alan Miller
(74) *Attorney, Agent, or Firm*—Townsend and Townsend and Crew LLP

(57) ABSTRACT

A method of organizing, storing and representing a hierarchy of human resource information and organizational responsibilities of an enterprise provides a human resource user the ability to define and view an organizational chart for a plurality of organizations within a company or enterprise. The method may be used to define a top node and a plurality of other nodes that then can have responsibilities and managers assigned to each node in the hierarchy. Each other manager can have multiple responsibilities, multiple managers or multiple delegations. A graphical user interface may allow users to select and manipulate different combinations of managers and responsibilities to view a hierarchy in an employee centric manner, using menus and drill down charts.

15 Claims, 22 Drawing Sheets

U.S. PATENT DOCUMENTS

| | | | |
|---|---|---|---|
| 2002/0030703 A1* | 3/2002 | Robertson et al. | 345/853 |
| 2002/0035500 A1* | 3/2002 | Yoko et al. | 705/9 |
| 2003/0004789 A1* | 1/2003 | Calderaro et al. | 705/11 |
| 2005/0223024 A1* | 10/2005 | Hyun et al. | 707/102 |
| 2007/0226027 A1* | 9/2007 | Chang et al. | 705/8 |

OTHER PUBLICATIONS http://web.archive.org/web/*/http://www.analytictech.com/mb021/departme.htm.*

Lediaev, Lucille ("Business basics: how to create an organizational chart", 2002 Pagewise; http://www.essortment.com/career/businessbasics_swgx.htm).*

Dan Vesset, Henry D. Morris, IDC White Paper, "Why Consider Oracle for Business Intelligence?" Sep. 2004 (12pgs).

Oracle Corporation, "Unified Business Intelligence Meets the Needs of 21st Century Business" (5pgs).

Oracle Corporation data sheet, "Oracle Daily Business Intelligence for Financials 11i" Jul. 2004 (8pgs).

* cited by examiner

ORGANIZATION HIERARCHY

- GLOBAL DIRECT SALES
  - EUROPEAN DIRECT SALES
    - GERMANY DIRECT SALES
    - ITALY DIRECT SALES
    - ENGLAND DIRECT SALES
    - FRANCE DIRECT SALES
- GLOBAL TELESALES
  - EUROPEAN TELESALES
    - ENGLAND DIRECT SALES
    - GERMANY DIRECT SALES
    - FRANCE DIRECT SALES

*FIG. 1*

HR SUPERVISOR HIERARCHY

- STEVEN ROBERTS - CEO

- CHARLES BAILEY - EXECUTIVE VP GLOBAL TELESALES ◄─┐  302

- BENNY WEBSTER - EXECUTIVE VP GLOBAL DIRECT SALES ◄─┐ 304

- JOE SMITH - SENIOR VP EUROPEAN DIRECT SALES AND TELESALES ◄─┐

- ROSEMARY PRITCHARD - VP EUROPEAN DIRECT SALES ◄─┐

- MAX K. - GERMANY AND ITALY DIRECT SALES

- JANE C. - ENGLAND DIRECT SALES   306

- LIZA B. - ENGLAND TELESALES

- ZOE F. - GERMANY TELESALES   308

- PETRA N. - FRANCE DIRECT SALES AND FRANCE TELESALES

*FIG. 3*

MANAGEMENT HIERARCHY

- STEVEN ROBERTS - CEO

- BENNY WEBSTER - GLOBAL DIRECT SALES

➡ • JOE SMITH - EUROPEAN DIRECT SALES

- ROSEMARY PRITCHARD - DIRECT SALES

- MAX K. - GERMANY DIRECT SALES

- MAX K. - ITALY DIRECT SALES

- JANE C. - ENGLAND DIRECT SALES

➡ • PETRA N. - FRANCE DIRECT SALES

- CHARLES BAILEY - GLOBAL TELESALES

➡ • JOE SMITH - EUROPEAN TELESALES

- LIZA B. - ENGLAND TELESALES

- ZOE F. - GERMANY TELESALES

➡ • PETRA N. - FRANCE TELESALES

*FIG. 4*

XYZ COMPANY REVENUE OVERVIEW

Currency: USD  
Product Category: All  
Period: Week  
Manager: Steven Roberts  
Compare to: Prior Period  
Responsability: All View By: Responsibility - Manager

| Responsibility/Manager | Net Booked (M) | Change | Revenue (M) | Revenue Booked This Period (M) | Change | Product revenue Backlog (M) | Change |
|---|---|---|---|---|---|---|---|
| Steven Roberts: CEO | | | | | | | |
| Benny Webster | 0 | 0% | 0 | 0 | 0% | 18,517 | 0% |
| Charles Bailey | 0 | 0% | 0 | 0 | 0% | 385 | 0% |
| Dorothy Daniels | 0 | 0% | 0 | 0 | 0% | 878 | 0% |
| James Connor | 0 | 0% | 0 | 0 | 0% | 64 | 0% |
| Steven Roberts | 0 | 0% | 0 | 0 | 0% | 5,290 | 0% |
| Subtotal | 0 | 0% | 0 | 0 | 0% | 25,133 | 0% |
| Grand Total | 0 | | 0 | 0 | | 25,133 | 0% |

(PERSONALIZE) (PRINTABLE PAGE)

Email  Export  Home  Logout  Help

Copyright 2004 XYZ CO

*FIG. 5*

XYZ COMPANY REVENUE OVERVIEW

Currency [USD ▶]  Period [Week ▶]  Compare to [Prior Period ▶]
Product Category [All ▶]  602 Manager [Steven Roberts ▶]  Responsability [All ▶]

View By [Responsibility - Manager ▶]

Dropdown options:
- Manager - Product Category
- Responsibility - Manager
- Responsibility - Responsibility
- Product Category - Manager
- Product Category - Responsibility

| Responsibility/Manager | Net Booked (M) | Change | Change | Product revenue Backlog (M) | Change |
|---|---|---|---|---|---|
| Steven Roberts: CEO | | | | | |
| Benny Webster | 0 | 0% | 0 | 18,517 | 0% |
| Charles Bailey | 0 | 0% | 0 | 385 | 0% |
| Dorothy Daniels | 0 | 0% | 0 | 878 | 0% |
| James Connor | 0 | 0% | 0 | 64 | 0% |
| Steven Roberts | 0 | 0% | 0 | 5,290 | 0% |
| Subtotal | 0 | 0% | 0 | 25,133 | 0% |
| Grand Total | 0 | 0% | 0 | 25,133 | 0% |

(PERSONALIZE)  (PRINTABLE PAGE)

Copyright 2004 XYZ CO    Email  Export  Home  Logout  Help

*FIG. 6*

XYZ COMPANY REVENUE OVERVIEW

Currency: USD  
Product Category: All  
Period: Week  
Manager: Steven Roberts  
Compare to: Prior Period  
Responsability: All  
View By: Responsibility - Responsibility

| Responsibility/Responsibility | Net Booked (M) | Change | Revenue (M) | Revenue Booked This Period (M) | Change | Product revenue Backlog (M) | Change |
|---|---|---|---|---|---|---|---|
| Steven Roberts: CEO | | | | | | | |
| Benny Webster: Global Direct Sales | 0 | 0% | 0 | 0 | 0% | 18,517 | 0% |
| Charles Bailey: Global TeleSales | 0 | 0% | 0 | 0 | 0% | 385 | 0% |
| Dorothy Daniels: Global Consulting | 0 | 0% | 0 | 0 | 0% | 878 | 0% |
| James Connor: Global Services | 0 | 0% | 0 | 0 | 0% | 64 | 0% |
| Steven Roberts: Unassigned | 0 | 0% | 0 | 0 | 0% | 5,290 | 0% |
| Subtotal | 0 | 0% | 0 | 0 | 0% | 25,133 | 0% |
| Grand Total | | | | | | 25,133 | |

PERSONALIZE    PRINTABLE PAGE

Email    Export    Home    Logout    Help

Copyright 2004 XYZ CO

FIG. 7

Currency [USD] ▶   Period [Week] ▶   Compare to [Prior Period] ▶
Product Category [All] ▶   Manager [All] ▶   Responsibility [Steven Roberts] ▶

View By [Responsibility - Responsabil] ▶

| Responsibility/ Responsibility | Net Booked (M) | Change | Revenue (M) | Revenue Booked This Period (M) | Change | Product revenue Backlog (M) | Change |
|---|---|---|---|---|---|---|---|
| Benny Webster: Global Direct Sales | | | | | | | |
| Joe Smith: EU Direct Sales | | 0% | 0 | 0 | 0% | 13,606 | 0% |
| Laura Randle: Asia Pacific Direct Sales | | 0% | 0 | 0 | 0% | 1,032 | 0% |
| Malcom Wesley: N. America Direct Sales | | 0% | 0 | 0 | 0% | 2,794 | 0% |
| Marco Ricci: S. America Direct Sales | | 0% | 0 | 0 | 0% | 1,085 | 0% |
| Subtotal | | 0% | 0 | 0 | 0% | 18,517 | 0% |
| Charles Bailey: Global TeleSales | | | | | | | |
| Bryan Morris: US TeleSales | | 0% | 0 | 0 | 0% | 246 | 0% |
| Jennifer Vickery: Canada TeleSales | | 0% | 0 | 0 | 0% | 37 | 0% |
| Joe Smith: Europe telesales | | 0% | 0 | 0 | 0% | 25 | 0% |
| Laura Randle: Asia Pacific TeleSales | | 0% | 0 | 0 | 0% | 68 | 0% |
| Subtotal | | 0% | 0 | 0 | 0% | 376 | 0% |
| Grand Total | | 0% | 0 | 0 | 0% | 19,269 | 0% |

*FIG. 8*

Currency [USD] ▶   Period [Week] ▶   Compare to [Prior Period] ▶
Product Category [All] ▶   Manager [All] ▶   Responsibility [Benny Webster:]  ▶

View By [Responsibility - Responsabil] ▶

| Responsibility/ Responsibility | Net Booked (M) | Change | Revenue (M) | Revenue Booked This Period (M) | Change | Product revenue Backlog (M) | Change |
|---|---|---|---|---|---|---|---|
| Joe Smith EU Direct Sales | | | | | | | |
| Rosemary Pritchard: EU Direct Sales | | 0% | 0 | 0 | 0% | 13,606 | 0% |
| Subtotal | | 0% | 0 | 0 | 0% | 13,606 | 0% |
| Laura Randle: Asia Pacific Direct Sales | | | | | | | |
| Cynthia Tsang: China Direct Sales | | 0% | 0 | 0 | 0% | 221 | 0% |
| Elaine Anthony: N. America Direct Sales | | 0% | 0 | 0 | 0% | 172 | 0% |
| Jordan Eastwood: AU Direct Sales | | 0% | 0 | 0 | 0% | 402 | 0% |
| Subtotal | | 0% | 0 | 0 | 0% | 795 | 0% |
| Malcom Wesley: N. America Direct Sales | | | | | | | |
| Patrick Tull: Canada Direct Sales | | 0% | 0 | 0 | 0% | 796 | 0% |
| Robin Sherman: US East Direct Sales | | 0% | 0 | 0 | 0% | 1,038 | 0% |
| Sylvia Prause: US Central Direct Sales | | 0% | 0 | 0 | 0% | 743 | 0% |
| Ted Rundgren: US West Direct Sales | | 0% | 0 | 0 | 0% | | 0% |

FIG. 9

Currency [USD] ▸　　　　Period [Week] ▸　　　　Compare to [Prior Period] ▸
Product Category [All] ▸　　Manager [All] ▸　　　Responsibility [Benny Webster:] ▸

View By [Responsibility - Manager] ▸

| Responsibility/Manager | Net Booked (M) | Change | Revenue (M) | Revenue Booked This Period (M) | Change | Product revenue Backlog (M) | Change |
|---|---|---|---|---|---|---|---|
| Joe Smith EU Direct Sales | | | | | | | |
| Rosemary Pritchard | 0 | 0% | 0 | 0 | 0% | 13,606 | 0% |
| Subtotal | | 0% | 0 | 0 | 0% | 13,606 | 0% |
| Laura Randle: Asia Pacific Direct Sales | | | | | | | |
| Cynthia Tsang | 0 | 0% | 0 | 0 | 0% | 221 | 0% |
| Elaine Anthony | 0 | 0% | 0 | 0 | 0% | 172 | 0% |
| Jordan Eastwood | 0 | 0% | 0 | 0 | 0% | 402 | 0% |
| Subtotal | 0 | 0% | 0 | 0 | 0% | 795 | 0% |
| Malcom Wesley: N. America Direct Sales | | | | | | | |
| Patrick Tull | 0 | 0% | 0 | 0 | 0% | 796 | 0% |
| Robin Sherman | 0 | 0% | 0 | 0 | 0% | 1,038 | 0% |
| Sylvia Prause | 0 | 0% | 0 | 0 | 0% | 743 | 0% |
| Ted Rundgren | 0 | 0% | 0 | 0 | 0% | | 0% |

*FIG. 10*

XYZ COMPANY REVENUE OVERVIEW

File  Edit  View  Go  Help

Currency: USD  
Product Category: All

Period: Week  
Manager: Benny Webster  
Compare to: Prior Period  
Responsibility: Steven Roberts View By: Responsibility - Manager

| Responsibility/Manager | Net Booked (M) | Change | Revenue (M) | Revenue Booked This Period (M) | Change | Product revenue Backlog (M) | Change |
|---|---|---|---|---|---|---|---|
| Benny Webster: Global Direct Sales | | | | | | | |
| Joe Smith | 0 | 0% | 0 | 0 | 0% | 13,606 | 0% |
| Laura Randle | 0 | 0% | 0 | 0 | 0% | 1,032 | 0% |
| Malcom Wesley | 0 | 0% | 0 | 0 | 0% | 2,794 | 0% |
| Marco Ricci | 0 | 0% | 0 | 0 | 0% | 1,085 | 0% |
| Subtotal | 0 | 0% | 0 | 0 | 0% | 18,517 | 0% |
| Grand Total | 0 | | | 0 | | 18,517 | 0% |

PERSONALIZE  PRINTABLE PAGE

Copyright 2004 XYZ CO  
Email  Export  Home  Logout  Help

*FIG. 11*

| File | Edit | View | Go | Help |

XYZ COMPANY REVENUE OVERVIEW

Currency [USD ▶]  Period [Week ▶]  Compare to [Prior Period ▶]

Product Category [All ▶]  Manager [Joe Smith]  Responsibility [Benny Webster: ▶]

View By [Responsibility - Manager ▶]

| Responsibility/Manager | Net Booked (B) | Change | Revenue (B) | Revenue Booked This Period (B) | Change | Product revenue Backlog (B) | Change |
|---|---|---|---|---|---|---|---|
| Joe Smith: EU Direct Sales | | | | | | | |
| Rosemary Pritchard | 0 | 0% | 0 | 0 | 0% | 14 | 0% |
| Subtotal | 0 | 0% | 0 | 0 | 0% | 14 | 0% |
| Grand Total | 0 | 0% | 0 | 0 | 0% | 14 | 0% |

(PERSONALIZE)  (PRINTABLE PAGE)

Copyright 2004 XYZ CO          Email  Export  Home  Logout  Help

FIG. 12

File  Edit  View  Go  Help

XYZ COMPANY REVENUE OVERVIEW

Currency [USD ▶]  Period [Week ▶]  Compare to [Prior Period ▶]

Product Category [All ▶]  Manager [Rosemary Pritchard ▶]  Responsibility [Joe Smith: EU Di ▶]

View By [Responsibility - Manager ▶]

| Responsibility/Manager | Net Booked (M) | Change | Revenue (M) | Revenue Booked This Period (M) | Change | Product revenue Backlog (M) | Change |
|---|---|---|---|---|---|---|---|
| Rosemary Pritchard: EU Direct Sales | | | | | | | |
| Brigitte Carter | 0 | 0% | 0 | 0 | 0% | 139 | 0% |
| Max Kingston | 0 | 0% | 0 | 0 | 0% | 1,058 | 0% |
| Petra Nicolivic | 0 | 0% | 0 | 0 | 0% | 12,409 | 0% |
| Subtotal | 0 | 0% | 0 | 0 | 0% | 13,606 | 0% |
| Grand Total | 0 | 0% | 0 | 0 | 0% | 13,606 | 0% |

(PERSONALIZE)  (PRINTABLE PAGE)

Copyright 2004 XYZ CO  Email  Export  Home  Logout  Help

| File | Edit | View | Go | Help |
|------|------|------|-----|------|

XYZ COMPANY REVENUE OVERVIEW

Currency [USD ▶]  Period [Week ▶]  Compare to [Prior Period ▶]
Product Category [All ▶]  Manager [Rosemary Pritchard ▶]  Responsibility [Joe Smith: EU Di ▶]
View By [Responsibility - Responsibil ▶]

| Responsibility/ Responsibility | Net Booked (M) | Change | Revenue (M) | Revenue Booked This Period (M) | Change | Product revenue Backlog (M) | Change |
|---|---|---|---|---|---|---|---|
| Rosemary Pritchard: EU Direct Sales | | | | | | | |
| Brigitte Carter: GB Direct Sales | 0 | 0% | 0 | 0 | 0% | 139 | 0% |
| Max Kingston: DE Direct Sales | 0 | 0% | 0 | 0 | 0% | 422 | 0% |
| Max Kingston: IT Direct Sales | 0 | 0% | 0 | 0 | 0% | 635 | 0% |
| Petra Nicolivic: FR Direct Sales | 0 | 0% | 0 | 0 | 0% | 12,409 | 0% |
| Subtotal | 0 | 0% | 0 | 0 | 0% | 13,606 | 0% |
| Grand Total | 0 | 0% | 0 | 0 | 0% | 13,606 | 0% |

( PERSONALIZE )  ( PRINTABLE PAGE )

Copyright 2004 XYZ CO        Email  Export  Home  Logout  Help

| File | Edit | View | Go | Help |

XYZ COMPANY REVENUE OVERVIEW

Currency [USD] ▼     Period [QTR] ▼     Compare to [Prior Period] ▼

Product Category [All] ▼     Manager [Charles Bailey] ▼     Responsibility [Steven Roberts: (] ▼

View By [Responsibility - Manager] ▼

| Responsibility/ Responsibility | Net Booked (M) | Change | Revenue (M) | Revenue Booked This Period (M) | Change | Product revenue Backlog (M) | Change |
|---|---|---|---|---|---|---|---|
| Charles Bailey: Global TeleSales | | | | | | | |
| Bryan Morris | 0 | 0% | 0 | 0 | 0% | 245,527 | 0% |
| Jennifer Vickery | 0 | 0% | 0 | 0 | 0% | 37,409 | 0% |
| Joe Smith | 0 | 0% | 0 | 0 | 0% | 25,434 | 0% |
| Laura Randle | 0 | 0% | 0 | 0 | 0% | 67,925 | 0% |
| Parker Franklin | 0 | 0% | 0 | 0 | 0% | 8,224 | 0% |
| Subtotal | 0 | 0% | 0 | 0 | 0% | 384,520 | 0% |
| Grand Total | | | | | | 384,520 | 0% |

(PERSONALIZE) (PRINTABLE PAGE)

Copyright 2004 XYZ CO     Email   Export   Home   Logout   Help

*FIG. 15*

XYZ COMPANY REVENUE OVERVIEW

Currency: USD  
Product Category: All  
Period: QTR  
Manager: Charles Bailey  
Compare to: Prior Period  
Responsibility: Steven Roberts View By: Responsibility - Responsibility

| Responsibility/ Responsibility | Net Booked (K) | Change | Revenue (K) | Revenue Booked This Period (K) | Change | Product revenue Backlog (K) | Change |
|---|---|---|---|---|---|---|---|
| Charles Bailey: Global TeleSales | | | | | | | |
| Bryan Morris: US TeleSales | 0 | 0% | 0 | 0 | 0% | 245,527 | 0% |
| Jennifer Vickery: Canada TeleSales | 0 | 0% | 0 | 0 | 0% | 37,409 | 0% |
| Joe Smith: EU TeleSales | 0 | 0% | 0 | 0 | 0% | 25,434 | 0% |
| Laura Randle: Asia Pacific TeleSales | 0 | 0% | 0 | 0 | 0% | 67,925 | 0% |
| Parker Franklin: S. America TeleSales | 0 | 0% | 0 | 0 | 0% | 8,224 | 0% |
| Subtotal | 0 | 0% | 0 | 0 | 0% | 384,520 | 0% |
| Grand Total | 0 | | 0 | 0 | | 384,520 | 0% |

PERSONALIZE   PRINTABLE PAGE

Copyright 2004 XYZ CO          Email  Export  Home  Logout  Help

*FIG. 16*

XYZ COMPANY REVENUE OVERVIEW

Currency [USD ▶]   Period [QTR ▶]   Compare to [Prior Period ▶]

Product Category [All ▶]   Manager [Joe Smith ▶]   Responsibility [Charles Bailey: G ▶]

View By [Responsibility - Responsibili ▶]

| Responsibility/ Responsibility | Net Booked (K) | Change | Revenue (K) | Revenue Booked This Period (K) | Change | Product revenue Backlog (K) | Change |
|---|---|---|---|---|---|---|---|
| Joe Smith: EU TeleSales | | | | | | | |
| Lisa Beckman: GB TeleSales | 0 | 0% | 0 | 0 | 0% | 4,512 | 0% |
| Petra Nicolivic: FR TeleSales | 0 | 0% | 0 | 0 | 0% | 8,965 | 0% |
| Zoe Fox: DE TeleSales | 17 | 0% | 0 | 0 | 0% | 11,957 | 0% |
| Subtotal | 17 | 0% | 0 | 0 | 0% | 25,434 | 0% |
| Grand Total | 17 | 0% | 0 | 0 | 0% | 25,434 | 0% |

(PERSONALIZE)  (PRINTABLE PAGE)

Email   Export   Home   Logout   Help

Copyright 2004 XYZ CO

FIG. 17

| Currency USD ▼ | | | | Period Week ▼ | | Compare to Prior Period ▼ | |
|---|---|---|---|---|---|---|---|
| Product Category All ▼ | | Manager All | ▼ | | | Responsibility Joe Smith: EU Di ▼ | |
| | | View By | Product Category - Manager ▼ | | | | |

| Product Category/ Manager | Net Booked (K) | Change | Revenue (K) | Revenue Booked This Period (K) | Change | Product revenue Backlog (K) | Change |
|---|---|---|---|---|---|---|---|
| License (Y68) | | | | | | | |
| Andrews, Jr., Robert E (Bob) | 0 | 0% | 0 | 0 | 0% | 11,925 | 0% |
| Steen, Douglas Duane | 0 | 0% | 0 | 0 | 0% | 4,511 | 0% |
| Welch, Lisa R. | 0 | 0% | 0 | 0 | 0% | 8,015 | 0% |
| Subtotal | 0 | 0% | 0 | 0 | 0% | 24,451 | 0% |
| Unassigned | | | | | | | |
| Andrews, Jr., Robert E (Bob) | 0 | 0% | 0 | 0 | 0% | 33 | 0% |
| Steen, Douglas Duane | 0 | 0% | 0 | 0 | 0% | 0 | 0% |
| Welch, Lisa R. | 0 | 0% | 0 | 0 | 0% | 945 | 0% |
| Subtotal | 0 | 0% | 0 | 0 | 0% | 978 | 0% |
| Grand Total | 0 | 0% | 0 | 0 | 0% | 25,429 | 0% |

PERSONALIZE  PRINTABLE PAGE

Copyright 2004 XYZ CO          Email  Export  Home  Logout  Help

*FIG. 18*

| Product Cat. | All | | Manager | All | | Responsibility | Joe Smith: EU Dii ▶ | |
|---|---|---|---|---|---|---|---|---|

View By | Product Category - Manager ▶ |

| Product Category Manager | Net Booked (K) | Change | Revenue (K) | Revenue Booked This Period (K) | Change | Product revenue Backlog (K) | Change |
|---|---|---|---|---|---|---|---|
| License (Y68) | | | | | | | |
| Drill / Pivot | | | | | | | |
| Manager - Product Category | 0 | 0% | 0 | 0 | 0% | 11,925 | 0% |
| Responsibility - Manager | | | | | | | |
| Responsibility - Responsibility | 0 | 0% | 0 | 0 | 0% | 4,511 | 0% |
| Product Category - Responsibility | | | | | | | |
| Welch, Lisa R. | 0 | 0% | 0 | 0 | 0% | 8,015 | 0% |
| Subtotal | 0 | 0% | 0 | 0 | 0% | 24,451 | 0% |
| Unassigned | | | | | | | |
| Andrews, Jr., Robert E (Bob) | 0 | 0% | 0 | 0 | 0% | 33 | 0% |
| Steen, Douglas Duane | 0 | 0% | 0 | 0 | 0% | 0 | 0% |
| Welch, Lisa R. | 0 | 0% | 0 | 0 | 0% | 945 | 0% |
| Subtotal | 0 | 0% | 0 | 0 | 0% | 978 | 0% |
| Grand Total | 0 | 0% | 0 | 0 | 0% | 25,429 | 0% |

PERSONALIZE   PRINTABLE PAGE

Copyright 2004 XYZ CO    Email  Export  Home  Logout  Help

*FIG. 19*

Product Cat. [License (Y68) ▼]  Manager [All ▼]  Responsibility [Joe Smith: EU Di ▼]

View By [Manager - Product Category ▼]

| Manager Product Category | Net Booked (K) | Change | Revenue (K) | Revenue Booked This Period (K) | Change | Product revenue Backlog (K) | Change |
|---|---|---|---|---|---|---|---|
| Andrews Jr., Robert (Bob) | | | | | | | |
| Applications (YF1) | 0 | 0% | 0 | 0 | 0% | 2,917 | 0% |
| Database Tech (YF0) | 0 | 0% | 0 | 0 | 0% | 9,007 | 0% |
| Subtotal | 0 | 0% | 0 | 0 | 0% | 11,925 | 0% |
| Steen, Douglas Duane | | | | | | | |
| Applications (YF1) | 0 | 0% | 0 | 0 | 0% | 2,426 | 0% |
| Database Tech (YF0) | 0 | 0% | 0 | 0 | 0% | 2,085 | 0% |
| Subtotal | 0 | 0% | 0 | 0 | 0% | 4,511 | 0% |
| Welch, Lisa R. | | | | | | | |
| Applications (YF1) | 0 | 0% | 0 | 0 | 0% | 6,300 | 0% |
| Database Tech (YF0) | 0 | 0% | 0 | 0 | 0% | 1,715 | 0% |
| Subtotal | 0 | 0% | 0 | 0 | 0% | 8,015 | 0% |
| Grand Total | 0 | 0% | 0 | 0 | 0% | 24,451 | 0% |

(PERSONALIZE)  (PRINTABLE PAGE)

Email   Export   Home   Logout   Help

Copyright 2004 XYZ CO

FIG. 20

| File | Edit | View | Go | Help | | | | | |
|---|---|---|---|---|---|---|---|---|---|

XYZ COMPANY REVENUE OVERVIEW

| Currency | USD ▶ | | Period | Week ▶ | | Compare to | Prior Period ▶ |
|---|---|---|---|---|---|---|---|
| Product Cat. | All ▶ | | Manager | Joe Smith ▶ | | Responsibility | All ▶ |
| | | | Customer | All ▶ | | View By | Responsibility - Manager ▶ |

| Responsibility / Manager | Net Booked (K) | Change | Revenue (K) | Revenue Booked This Period (K) | Change | Product revenue Backlog (K) | Change |
|---|---|---|---|---|---|---|---|
| Joe Smith: EU Direct Sales | | | | | | | |
| Rosemary Pritchard | 157,782 | 0% | 0 | 0 | 0% | 13,606,076 | 0% |
| Subtotal | 157,782 | 0% | 0 | 0 | 0% | 13,606,076 | 0% |
| Joe Smith: EU TeleSales | | | | | | | |
| Lisa Beckman | 1,212 | 0% | 0 | 0 | 0% | 4,512 | 0% |
| Petra Nicolovic | 2,264 | 0% | 0 | 0 | 0% | 8,965 | 0% |
| Zoe Fox | 3,963 | 0% | 0 | 0 | 0% | 11,957 | 0% |
| Subtotal | 7,438 | 0% | 0 | 0 | 0% | 25,434 | 0% |
| Grand Total | 165,220 | 0% | 0 | 0 | 0% | 24,451 | 0% |

(PERSONALIZE)  (PRINTABLE PAGE)

Copyright 2004 XYZ CO          Email  Export  Home  Logout  Help

MANAGEMENT HIERARCHY FOR ENTERPRISE APPLICATIONS AND METHODS AND SYSTEMS FOR GENERATING REPORTS USING SAME

BACKGROUND OF THE INVENTION

1. Field of the Invention

The present invention relates to methods and systems for organizing and representing corporate HR and management responsibility data.

2. Description of the Prior Art and Related Information

In a traditional "old style" company, each person reports to one and only one supervisor and that supervisor is responsible for the employee's career development, performance evaluations, and salary adjustments as well as for giving that employee their day-to-day work assignments and monitoring the timely completion of those assignments. In this case, it is sufficient to show a manager the information about the people who directly report to them. This information is meaningful to that person, because they are responsible for the quality of the work of the people who report to them. If, however, there is a person who is responsible for a set of operations in the company, but the employees who work in that department do not report directly to that person, then that person would have to somehow generate a report that shows the performance of the department rather than a report detailing the performance of the people that work for him. This report by department (or organization) would give that person the information she needs, or would give her superiors the information they need to analyze performance. The association between that manager and the department, however, is not a relationship that is typically stored in the system. The person who requests the report must know the person they are evaluating well enough to know what responsibilities have been given to that person and what dimension and dimension value should be chosen to generate the correct report. They may also have to run multiple reports if the person has been given multiple responsibilities.

FIG. 1 shows a conventional organization hierarchy 100 of the sales organization of an exemplary company called XYZ Company. As shown, the sales hierarchy 100 is headed by global sales 102, to which the global direct sales department 104 and the global telesales department 106 report. The European direct sales department 108 reports to the global direct sales department 104 and the European telesales 110 reports to the Global telesales department 106. The national direct sales departments for Germany, Italy, England and France shown at 112, 114, 116 and 118 respectively, report to the European direct sales department 108. Similarly, the telesales departments 120, 122 and 124 for England, Germany and France, respectively, report to the European telesales department 110. FIG. 2 shows another representation of the organization hierarchy 100. This representation, in addition to the structure of XYZ's sales organization, also shows the person(s) in charge of each of the aforementioned departments, and whom they report to. In this fictitious company, Steven Roberts is the CEO of XYZ, as shown at 202. Benny Webster is in charge of the global direct sales department, as shown at 204 and Charles Bailey heads the global telesales department, as shown at 206. Both Mr. Webster and Mr. Bailey report to Steven Roberts. As shown in FIG. 2 at 208, Joe Smith reports to Benny Webster and is responsible for European direct sales, but has delegated day to day operational responsibility for European direct sales to Rosemary Pritchard. Joe Smith, in turn, reports to Charles Bailey and heads European telesales, as shown at 210. As shown at 212 and 220, Petra K is responsible for both direct and telesales in France. Max K is responsible for direct sales in both Germany and Italy, as suggested by 214 and 216. Zoe F. heads up telesales operations in Germany. Finally, direct sales in Great Britain are Jane C's responsibility, while telesales in Great Britain are headed by Liza B. As also shown, Max K. and Jane C. report to Joe Smith through Rosemary Pritchard, while Zoe F. and Liza B report to Joe Smith. As is proper in view of her responsibilities, Petra N. reports to Joe Smith through Rosemary Pritchard for European direct sales activities in France and to Joe Smith for telesales activities in France.

FIG. 3 shows an example of a conventional Human Resources (HR) supervisor hierarchy of the XYZ sales force. This hierarchy 300 shows the relationships in XYZ's sales force from an HR point of view and from an operational point of view. Corporate officer titles are included and the down arrows show the reports (if any) of each person within the hierarchy. The up arrows 302, 304, 306 and 308 are used to indicate reporting relationships, such as when a person with more than one responsibility reports to more than one person. For example, Joe smith, as shown at 302 reports to Charles Bailey for European telesales matters and to Benny Webster for European direct sales matters. Similarly, Petra N reports to Rosemary Pritchard for French direct sales and to Joe Smith for French telesales. In other words, Petra N's HR manager is Joe Smith, who is also her operational manager for French direct sales, as shown at 306. Petra N's operational manager for French direct sales, however, is Rosemary Pritchard as indicated at 308, and not Joe Smith. Likewise, Joe Smith's HR manager is Benny Webster, who is also Joe Smith's operational manager for European direct sales. Charles Bailey, on the other hand is Joe Smith's operational manager for European telesales, as shown at 302.

From these HR hierarchies such as shown in FIGS. 1-3, applications may generate reports to evaluate key indicators that may help managers set performance objectives for their organizations and measure how their reports are executing against those set objectives. At the highest levels in the company, the executive managers have the ability to view the performance of all areas of the enterprise. It is these top level managers that are the ones responsible for ensuring that the objectives of each individual department meet the objectives of the enterprise as a whole. For example, top-level managers may want to know how well are their managers performing and how efficient is the current organizational structure of the enterprise. Toward that end, it is useful for the top-level managers to have the ability to generate reports on the operational responsibilities of the persons reporting to them and on the performance of their manager's organizations.

The complex organizational structure of modern enterprises makes the visualization of responsibilities and performance of those involved in the running of the enterprise especially difficult. The problem is often exacerbated by the fact that many employees, in the performance of their duties, often report to more than one manager, as detailed relative to FIGS. 1-3. The problem, therefore, of how best to represent an employee's position within a hierarchical management structure, together with an accurate representation of all of the employee's operational responsibilities has often proved to an unwieldy one. Moreover, given that an employee may have several responsibilities distributed across several management or business units, it has proven to be difficult to gain an accurate insight into all of the employee's responsibilities and an accurate measure of how they are performing in each of their responsibilities. Current state of the art business intelligence applications provide business metrics along many different dimensions. When such conventional applications refer to the 'manager' dimension, they usually refer to only the HR supervisor dimension. This leads to problems when a same person manages two sales groups, as detailed above. In that case, to see the total sales results for which that person has responsibility, it is necessary to either manually add up the results for both sales groups or to create a fictitious (i.e., that has no existence but for reporting purposes) rollup sales group that represents both sales groups combined. The relative fluidity of today's sales force renders the situation worse. For example, such fictitious sales groups must be changed whenever a manager's responsibilities change or when a manager leaves or is added, rendering the organizational and HR hierarchies very unstable and prior period comparisons difficult.

From the foregoing, it may be appreciated that improved computer-implemented methods and systems for mapping, representing and storing complex HR and operational relationships within an enterprise are needed. Specifically, such methods and systems should accurately model the fact that employees have different HR and operational managers, if needed. Such methods and systems should accurately represent the results of the organization and to identify the person or persons responsible for those results. In addition, such methods and systems should accurately represent summarized results for all organizations managed by the same person. Moreover, such methods and systems should enable analysis of the performance of a manager without having to define a fictitious or dummy organization that accurately represents all of the manager's responsibilities.

SUMMARY OF THE INVENTION

Embodiments of the present invention include a computer-implemented method of organizing, storing and representing human resource (HR) information and organizational responsibilities of an enterprise having a plurality of organizations in a hierarchy. The method may include steps of defining a top node of the hierarchy, defining a top node responsibility that is responsible for the enterprise as a whole and storing the top node responsibility in memory; defining at least one responsibility for each of the plurality of organizations within the enterprise and storing the defined responsibilities in memory; establishing a hierarchical position for each defined responsibility within the hierarchy, such that each defined responsibility except the top node responsibility reports to another defined responsibility of higher rank within the hierarchy and storing the established hierarchical position for each defined responsibility in memory; assigning an operational manager to each defined responsibility and storing each assigned operational manager in memory, wherein each operational manager reports to at least one other operational manager such that at least one operational manager is assigned to more than one responsibility and reports to a different operational manager for each assigned responsibility, and generating a report based upon the hierarchically-established positions for each defined responsibility by retrieving from memory and manipulating the stored responsibilities, established hierarchical positions and assigned operational managers.

According to further embodiments, the method may further include a step of storing performance-related information and associating the stored performance-related information to at least one defined responsibility. The performance-related information may include sales data, for example. The operational manager(s) that are assigned to more than one responsibility may appear in the hierarchy once for each assigned responsibility. The report may be selectively configurable to show a selected responsibility and all hierarchically-lower responsibilities that report to the selected responsibility; a selected responsibility and all operational managers having responsibilities that report to the selected responsibility; a selected operational manager and all responsibilities that report to the responsibility to which the selected operational manager is assigned, and/or a selected operational manager and all operational managers having responsibilities that report to the responsibility to which the selected operational manager is assigned.

According to another embodiment thereof, the present invention is also a computer system for organizing, storing and representing human resource (HR) information and organizational responsibilities of an enterprise having a plurality of organizations in a hierarchy. According to this embodiment, the computer system may include at least one processor; at least one data storage device coupled to the at least one processor and a plurality of processes spawned by said at least one processor. The processes may include processing logic for defining a top node of the hierarchy, defining a top node responsibility that is responsible for the enterprise as a whole and storing the top node responsibility in memory; defining at least one responsibility for each of the plurality of organizations within the enterprise and storing the defined responsibilities in memory; establishing a hierarchical position for each defined responsibility within the hierarchy, such that each defined responsibility except the top node responsibility reports to another defined responsibility of higher rank within the hierarchy and storing the established hierarchical position for each defined responsibility in memory; assigning an operational manager to each defined responsibility and storing each assigned operational manager in memory, wherein each operational manager reports to at least one other operational manager such that at least one operational manager is assigned to more than one responsibility and reports to a different operational manager for each assigned responsibility, and generating a report based upon the hierarchically-established positions for each defined responsibility by retrieving from memory and manipulating the stored responsibilities, established hierarchical positions and assigned operational managers.

According to further embodiments, tem of claim 6, the processes may include processing logic for storing performance-related information and associating the stored performance-related information to at least one defined responsibility. The performance-related information includes sales data, for example. One or more operational managers that are assigned to more than one responsibility may appear in the hierarchy once for each assigned responsibility. The report may be selectively configurable to show: a selected responsibility and all hierarchically-lower responsibilities that report to the selected responsibility; a selected responsibility and all operational managers having responsibilities that report to the selected responsibility; a selected operational manager and all responsibilities that report to the responsibility to which the selected operational manager is assigned, and/or a selected operational manager and all operational managers having responsibilities that report to the responsibility to which the selected operational manager is assigned.

According to another embodiment thereof, the present invention is also a machine-readable medium having data stored thereon representing sequences of instructions which, when executed by a computing device, causes the computing device to organize, store and represent human resource (HR) information and organizational responsibilities of an enterprise having a plurality of organizations in a hierarchy, by carrying out steps including: defining a top node of the hierarchy, defining a top node responsibility that is responsible for the enterprise as a whole and storing the top node responsibility in memory; defining at least one responsibility for each of the plurality of organizations within the enterprise and storing the defined responsibilities in memory; establishing a hierarchical position for each defined responsibility within the hierarchy, such that each defined responsibility except the top node responsibility reports to another defined responsibility of higher rank within the hierarchy and storing the established hierarchical position for each defined responsibility in memory; assigning an operational manager to each defined responsibility and storing each assigned operational manager in memory, wherein each operational manager reports to at least one other operational manager such that at least one operational manager is assigned to more than one responsibility and reports to a different operational manager for each assigned responsibility, and generating a report based upon the hierarchically-established positions for each defined responsibility by retrieving from memory and manipulating the stored responsibilities, established hierarchical positions and assigned operational managers.

The machine-readable medium may also store sequences of instructions that cause the computer to store performance-related information and to associate the stored performance-related information to at least one defined responsibility. The performance-related information includes sales data, for example. The operational manager(s) that are assigned to more than one responsibility may appear in the hierarchy once for each assigned responsibility. The report may be selectively configurable to show: a selected responsibility and all hierarchically-lower responsibilities that report to the selected responsibility; a selected responsibility and all operational managers having responsibilities that report to the selected responsibility; a selected operational manager and all responsibilities that report to the responsibility to which the selected operational manager is assigned, and/or a selected operational manager and all operational managers having responsibilities that report to the responsibility to which the selected operational manager is assigned.

BRIEF DESCRIPTION OF THE DRAWINGS

FIG. 1 shows an example of a conventional organizational hierarchy of the sales organization of an exemplary company called XYZ Company.

FIG. 3 shows an example of a conventional Human Resources (HR) supervisor hierarchy.

FIG. 4 shows an example of a management hierarchy, according to an embodiment of the present invention.

FIG. 5 is a representation of a report that may be obtained using the management hierarchy of FIG. 5, according to an embodiment of the present invention.

FIG. 6 is a representation of another report that may be obtained using the management hierarchy of FIG. 5, according to an embodiment of the present invention.

FIG. 7 is a representation of yet another report that may be obtained using the management hierarchy of FIG. 5, according to an embodiment of the present invention.

FIG. 8 is a representation of still another report that may be obtained using the management hierarchy of FIG. 5, according to an embodiment of the present invention.

FIG. 9 is a representation of another report that may be obtained using the management hierarchy of FIG. 5, according to an embodiment of the present invention.

FIG. 10 is a representation of a further report that may be obtained using the management hierarchy of FIG. 5, according to an embodiment of the present invention.

FIG. 11 is a representation of yet another report that may be obtained using the management hierarchy of FIG. 5, according to an embodiment of the present invention.

FIG. 12 is a representation of a still further report that may be obtained using the management hierarchy of FIG. 5, according to an embodiment of the present invention.

FIG. 13 is a representation of a report that may be obtained using the management hierarchy of FIG. 5, according to an embodiment of the present invention.

FIG. 14 is a representation of another still further report that may be obtained using the management hierarchy of FIG. 5, according to an embodiment of the present invention.

FIG. 15 is a representation of a still another report that may be obtained using the management hierarchy of FIG. 5, according to an embodiment of the present invention.

FIG. 16 is a representation of a yet further report that may be obtained using the management hierarchy of FIG. 5, according to an embodiment of the present invention.

FIG. 17 is a representation of yet another report that may be obtained using the management hierarchy of FIG. 5, according to an embodiment of the present invention.

FIG. 18 is a representation of a further report that may be obtained using the management hierarchy of FIG. 5, according to an embodiment of the present invention.

FIG. 19 is a representation of a still another report that may be obtained using the management hierarchy of FIG. 5, according to an embodiment of the present invention.

FIG. 20 is a representation of another report that may be obtained using the management hierarchy of FIG. 5, according to an embodiment of the present invention.

FIG. 21 is a representation of another report that may be obtained using the management hierarchy of FIG. 5, according to an embodiment of the present invention.

DETAILED DESCRIPTION

Figure 2:
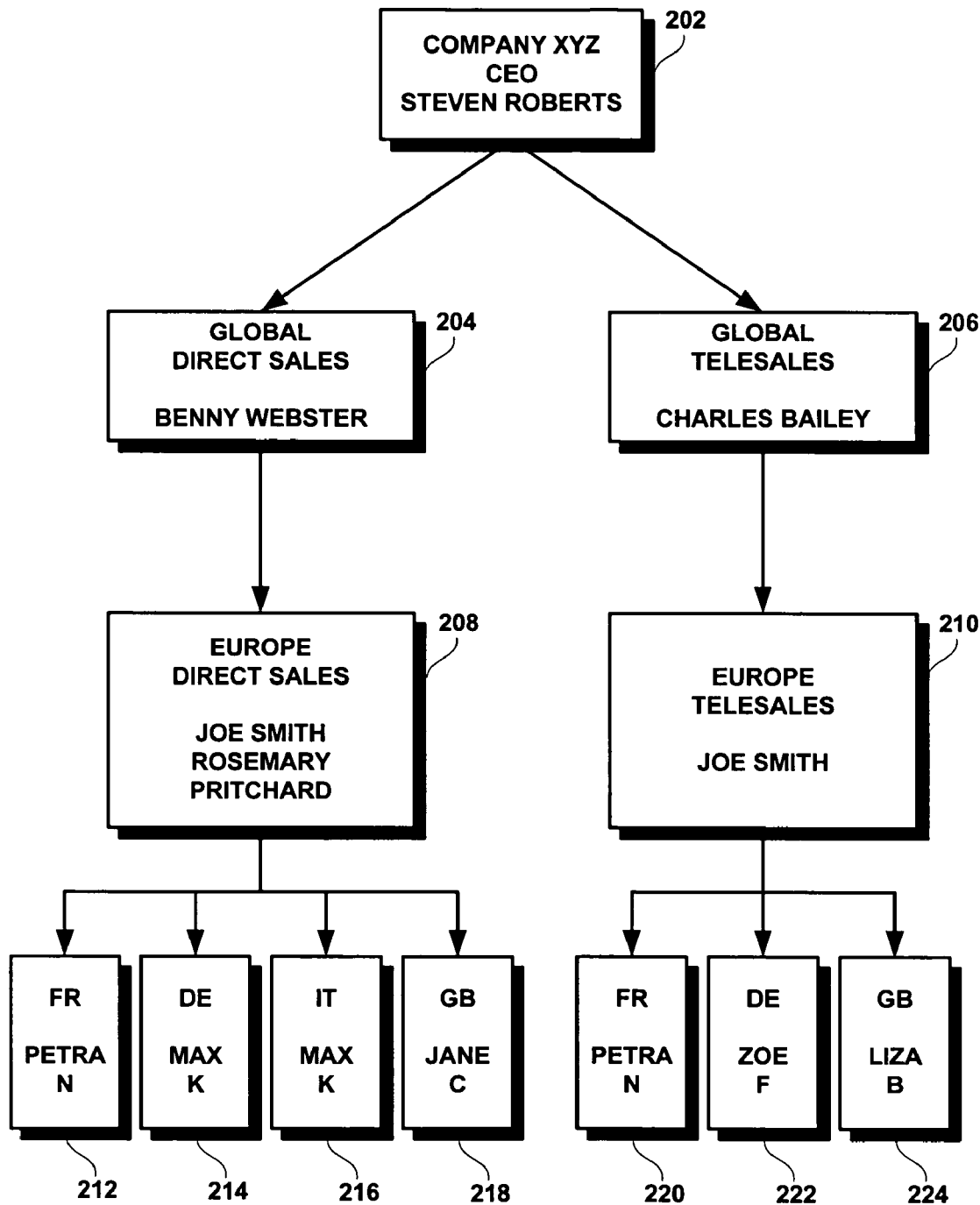
FIG. 2 is a graphical representation of the conventional organizational hierarchy of FIG. 1.

Aspects of an embodiment of the present invention are illustrated in FIG. 4. FIG. 4 shows a management hierarchy that combines an organization hierarchy for a company with the managers who are responsible for the company's organizations or departments. Embodiments of the present invention enable a common definition and tracking of all the operational responsibilities in the company. According to embodiments of the present invention, companies wishing to deploy the present invention may break down their work force into organizations (departments, or like functional groups), each of which is defined to have specific goals and objectives. These organizations roll up via an organization hierarchy to the top node, which is the entire company. Each department is assigned a lowest level manager. A single person may manage multiple organizations. When a person is assigned as the manager of an organization, that organization becomes that manager's responsibility, meaning that person has been given responsibility for the output of the organization to which he or she has been assigned. For each responsibility that a person has, the person will report into another responsibility for daily operations. If one person has two or more responsibilities (that is, has been assigned as manager of two or more organizations), they may have a different manager for each responsibility. This forms a hierarchy of responsibilities (not just a hierarchy or organizations or a hierarchy of people as is conventional, but a hierarchy of responsibilities—which may include people/organization combinations).

This hierarchy of responsibilities may be termed a management hierarchy, as shown at 400 in FIG. 4. It can be seen that the management hierarchy 400 is a hierarchy of responsibilities, which embody both the functionality of conventional HR hierarchies and the functionality of organization hierarchies to yield a construct having functionalities not found in either hierarchies individually. That is, the management hierarchy 400 is effective both as a people management tool (more useful for upper management) and as a tool that facilitates the evaluation of functional areas (more useful to the lower level managers). For multinational corporations that tend to organize around projects, each of which may have its own HR hierarchy, embodiments of the present invention are particularly useful. For example, when operational responsibilities for a large project are divided between two countries say, the US and India, there may be an HR hierarchy dedicated to that project in the US and another HR hierarchy dedicated to that project in India. However, the organizational hierarchy for the project as a whole cuts across both local HR hierarchies. Embodiments of the present invention can accurately represent the manner in which complex modern enterprises are organized and run, and thus provide both higher and lower level managers with the information and flexibility they require.

Turning now specifically to FIG. 4, and working from the bottom up, it may be seen that Petra N. is the local manager for France telesales. That is, France telesales is her responsibility. That responsibility reports to the European telesales, for which Joe Smith is the operational manager. Similarly, the Germany telesales is Zoe F's responsibility, which responsibility also reports to Joe Smith. Likewise, Liza B's responsibility, England telesales, also reports to Joe Smith, one of whose responsibility is European telesales. The European telesales responsibility reports to the global telesales responsibility, whose operational manager is Charles Bailey. In turn, both the global telesales (Charles Bailey) and the global direct sales responsibility (Benny Webster) report to the Steven Roberts, who currently has the CEO responsibility. Petra N., who has the France direct sales responsibility, Jane C., who has the England direct sales responsibility, Max K, who has both the Italy and Germany direct sales responsibility report to Rosemary Pritchard, who heads the day-to-day direct sales operations in Europe. Continuing up the management hierarchy 400, Rosemary Pritchard's direct sales responsibility reports to the European direct sales responsibility, for which Joe Smith is the operational manager. In turn, the European direct sales responsibility reports to the Global direct sales responsibility, headed by Benny Webster.

Note that, unlike the HR hierarchy of FIGS. 2 and 3, a single person may be represented twice in the same hierarchy. In the example of FIG. 4, Petra N. is responsible for both France telesales and France direct sales. Joe Smith is also represented twice in the management hierarchy of FIG. 4, as his responsibilities include both European direct sales and European telesales. This management hierarchy 400, which is a hierarchy of responsibilities, has multiple advantages over the traditional organization hierarchy of FIG. 1 and over the HR supervisor hierarchy of FIGS. 2 and 3. The management hierarchy according to embodiments of the present invention allows true modeling of the operational reporting relationships between the people running the organization. For example, the management hierarchy 400 allows an accurate representation of the case wherein people report to one person for part of their daily duties and report to another person for another part of their daily duties. For example, Petra N. reports to Joe Smith because part of her responsibilities (France telesales) reports to the European telesales responsibility. Petra N. also reports to Rosemary Pritchard because the other part of Petra's responsibilities is France direct sales, which responsibility reports to direct sales, headed by Rosemary Pritchard. Each responsibility in the management hierarchy has an operational manager. Each operational manager may have a single responsibility or may have more than one responsibility. It is to be noted that most of the time, this operational manager will also be the HR supervisor of the person, but need not be.

Another advantage of the structure and functionality of the management hierarchy 400 is that it properly models the delegation of responsibility from one manager to another. For example, it is common for an organization (such as European direct sales, for example) to have more than one person responsible for managing the operations of the organization. For example, in FIG. 4, European direct sales have both a VP (Rosemary Pritchard) and a senior VP (Joe Smith), with the VP reporting to the Senior VP. To represent this, a conventional organization hierarchy would only allow one node to be present in the organization chart for that sales organization, and only one person could be associated with that organization. With the present management hierarchy, the VP (e.g., Rosemary Pritchard) can have the responsibility managing the European direct sales organization and can report to the Senior VP (Joe Smith) who also has a management responsibility on this sales organization. It is only natural for managers having wide ranging responsibilities to try to find people to work for them who can take charge of a complete responsibility. They will delegate that responsibility to someone else, in the same manner that Joe Smith has delegated responsibility for European direct sales to Rosemary Pritchard. This does not mean that such operational managers are no longer for that which they have delegated. Quite to the contrary—they will continue to be held responsible for that organization from the perspective of upper management, but they have passed this responsibility down the chain of command. In the example of FIG. 4, Joe Smith, having delegated European direct sales responsibility to Rosemary Pritchard, still must answer to Benny Webster (the operational manager for the Global Direct Sales organization) for the performance of the European direct sales organization, and this is accurately represented in the management hierarchy of FIG. 4.

Another significant advantage of the management hierarchy over conventional HR and organization hierarchies is the reporting benefits. By understanding and correctly representing who has operational management responsibility for each organization and enabling these responsibilities to roll up to the top levels of the company, management reporting may be carried out from a true operational perspective. For example, if one person works for two different organizations, that is accurately reflected in the reports generated from management hierarchy data. If a responsibility has been delegated, that delegation is accurately reflected in the reports. Because each node in the management hierarchy identifies or is associated with both the responsibility and the operational manager for that responsibility, reports may be generated that show all responsibilities for each manager, or show all managers having responsibilities that report to any given node within the management hierarchy.

FIG. 5 is a representation of a exemplary report that may be obtained using the management hierarchy and relationships illustrated in FIG. 5, according to an embodiment of the present invention. As shown, the report of FIG. 5 shows the revenue in US dollars for all products attributable to Steven Roberts (the CEO of XYZ Company) and to his direct reports.

This is the Responsibility—Manager view, which gives the revenue from a person perspective—that is, from the perspective of the operational managers. It is to be noted that the reports shown in FIGS. 5-21 are only exemplary in nature and are intended to illustrate some of the advantages made possible using embodiment of the present invention. It is possible, for example, to generate reports on expenses attributable to operational managers and/or organizations, in the same manner that revenue-related reports are shown herein.

FIG. 6 shows the report of FIG. 5, with a pull-down menu 602 activated, to reveal a number of possible dimensions over which to view the data associated with the constituent nodes of the management hierarchy according to embodiments of the present invention. The report of FIG. 7 may be generated by selecting the Responsibility—Responsibility view. This report is similar to that shown in FIG. 6, but shows the responsibilities of each of Steven Roberts' reports. Here again, a single person may be listed more than once, if that person has more than one responsibility. In this case, the operational manager of the responsibility "unassigned"; namely, Steven Roberts reports to the CEO, which responsibility happens to be assigned to Steven Roberts also. According to embodiments of the present invention, no responsibility may be added to the management hierarchy unless it has an operational manager and reports to at least one other responsibility. The CEO responsibility is the exception to this rule, as it may not report to any other responsibility, although the management hierarchy may form part of a larger management hierarchy, in which case the CEO may well report to another hierarchically higher responsibility. That each responsibility in the management hierarchy must report to at least one other responsibility insures that no orphan nodes are created and that all responsibilities are properly reported on.

FIG. 8 shows the next level of responsibilities below the CEO level. As shown, the responsibilities that report to each of the responsibilities shown in FIG. 7 are shown in FIG. 8. However, it is possible to drill down to see only the responsibilities that report to any other responsibility in FIG. 7. For example, the responsibilities that report to the global direct sales could have been shown, while keeping all other responsibilities in their initial, unexploded state of FIG. 7. As shown in FIG. 8 and in FIG. 4, Joe Smith has a responsibility in both direct sales and telesales, and so he appears twice in the report of FIG. 8. Drilling into Benny Webster's responsibility, direct sales, yields the report of FIG. 9, in which it can be seen that Joe Smith has delegated Europe direct sales to Rosemary Pritchard. The other responsibilities that report to Benny Webster's responsibility (global direct sales) are also shown in FIG. 9, along with another level of hierarchically lower reports, and the names of the operational managers thereof.

Changing the view back to Responsibility—Manager on the same view as shown in FIG. 9 yields the layout shown in FIG. 10, in which the responsibilities of the hierarchically lower operational managers are not shown. The foregoing views were views from the perspective of the CEO responsibility. If, however, Benny Webster were to login himself, the view of FIG. 11 would result. The view of FIG. 11 is limited to direct sales, as Benny Webster's responsibility as global direct sales manager is limited to just that—global direct sales. In FIG. 11, in keeping with the selected Responsibility—Manager view, Benny Webster would see his direct sales responsibility (global direct sales) and the names of the operational managers that report to him. In the same manner, FIG. 12 shows the view Benny Webster would obtain by drilling into Joe Smith. FIG. 12 shows Joe Smith's responsibility (Europe direct sales) and the name of his direct report; namely, Rosemary Pritchard. Drilling in on Rosemary Pritchard, in turn, yields FIG. 13. FIG. 13 is another Responsibility—Manager view, and shows Rosemary Pritchard's responsibility (Europe direct sales, received through delegation from Joe Smith) and the names of the operational managers and sales figures of those that directly report to her. Changing the view back to Responsibility—responsibility yields the view of FIG. 14. In this view, it is worthy of note that Max Kingston appears twice, since he has been assigned two responsibilities: Germany direct sales and Italy direct sales. Therefore, unlike the Responsibility —Manager view of FIG. 13 where Max Kingston appears only once (he reports to Rosemary Pritchard and there is only one of him), in the Responsibility—Responsibility view, he is listed twice, once for each responsibility for which he reports to Rosemary Pritchard. Therefore, unlike a traditional HR hierarchy in which a single person can only be listed once, embodiments of the present invention, depending upon the selected view, a same person may appear more than once, depending upon the number of his or her responsibilities and to whom that person reports to for each of his or her responsibilities. This allows a far more flexible means of organizing and displaying information than is possible in conventional hierarchical representations.

From the view of FIG. 8, which is a Responsibility—Manager view of the global (direct and tele) sales responsibilities, the view of FIG. 15 is obtained by drilling into Charles Bailey (whose responsibility is global telesales) and changing the view to Responsibility-Manager. Therefore, Charles Bailey's name and responsibility appears, together with the names of the operational managers that report directly to him in their responsibility or in at least one of their responsibilities, together with their respective sales figures. Changing the view Responsibility—Manager view to responsibility—Responsibility yields the view of FIG. 16, in which the responsibilities of Charles Bailey's reports are also listed, together with their sales figures. Selecting (clicking on or otherwise actuating) the Joe Smith entry generates the view of FIG. 17, which yields Joe Smith's Europe telesales responsibility, together with the names and responsibilities of the operational managers that report to him, with their respective sales numbers.

Additional details of a responsibility may be obtained by selecting one of the responsibilities, such Joe Smith's responsibility of EU direct sales, for example. The view may also be changed from Responsibility—Responsibility or Responsibility—Manager to a product based view, as shown in FIG. 18. FIG. 18 shows a breakdown of Joe Smith's responsibilities from a product perspective. From a product point of view, Joe Smith's European telesales responsibilities are divided between licensing (License (Y68)) category and an unassigned category. Each of these categories also lists the operational managers to whom Joe Smith has delegated some or all of his responsibilities by categories, this being a Product—Manager view. Again, note that the same names may appear more than once in any view, if the person's hierarchical position and responsibilities warrant such multiple entries. As shown in FIG. 19, embodiments of the present invention enable a drill/pivot operation to both drill into a person's responsibility and to pivot the view as shown in FIG. 19.

As shown therein, the drill/pivot functionality enables the user to delve deeper into a person or a responsibility and to control the manner in which any hierarchically-lower information related thereto is displayed. For example, the drill/pivot functionality may enable the user to choose between views organized by Manager—Product Responsibility; Responsibility—Manager; Responsibility—Responsibility or Product Category—Responsibility, to identify only a few possible combinations. Drilling into the licensing revenue (Drill) and viewing the licensing revenue by Manager—Product Category (Pivot), for example, will generate a view from the management hierarchy that shows the licensing revenue attributable to each hierarchically lower manager to which Joe Smith has delegated responsibility, together with the product category that generated the revenue, as shown in FIG. 20. In this hypothetical and exemplary case, the product categories listed are Applications and Database Tech.

This same Responsibility—Manager view may be generated for all of Joe Smith's responsibilities. Recall that FIG. 4 lists Joe Smith as having responsibility for both European direct sales and European telesales. FIG. 21 is a view that may be generated by selecting Joe Smith in the "Manager" pull down menu and keeping the "View By" pull down on the Responsibility—Manager view. As shown, FIG. 21 shows, in a Responsibility/Manager format, both of Joe Smith's European sales responsibilities, along with his reports in each of the listed responsibilities, together with their sales.

Embodiments of the present invention provide a new dimension that confers important advantages in the world of management reporting. Managers like to manage through people. It is human nature. Managers need to know who to talk to if there is something wrong. With the management hierarchy according to embodiment of the present invention, managers can immediately see all the responsibilities of a manager without having to preliminarily create a fictitious organization to represent that person. Fictitious or fake organizations (or summary organizations) that are named after the manager are a Very common work-around to the problem of understanding who is responsible for what. If the organization is named after the manager, there is no question who is responsible. However, this means that the organization hierarchy of the company changes every time a manager comes or goes. This creates a very unstable hierarchy that does not allow comparison over time. Trend reporting is lost. Creating such fictitious organizations and maintaining an ever changing organization hierarchy places an enormous burden on the administrators of the organization hierarchy. The organization hierarchy should be the functional breakdown of the company and people are slotted into the management positions of those organizations. The organizations themselves should not have to change just because there is a new manager. When the present management hierarchy is implemented, the organizations need not change when managers arrive or depart. The present management hierarchy will provide better management reporting, will enable a much more stable organization hierarchy, will prevent redundant maintenance between the supervisor hierarchy and the organization hierarchy, and will provide better accountability for the performance of each department in the company.

Figure 22:
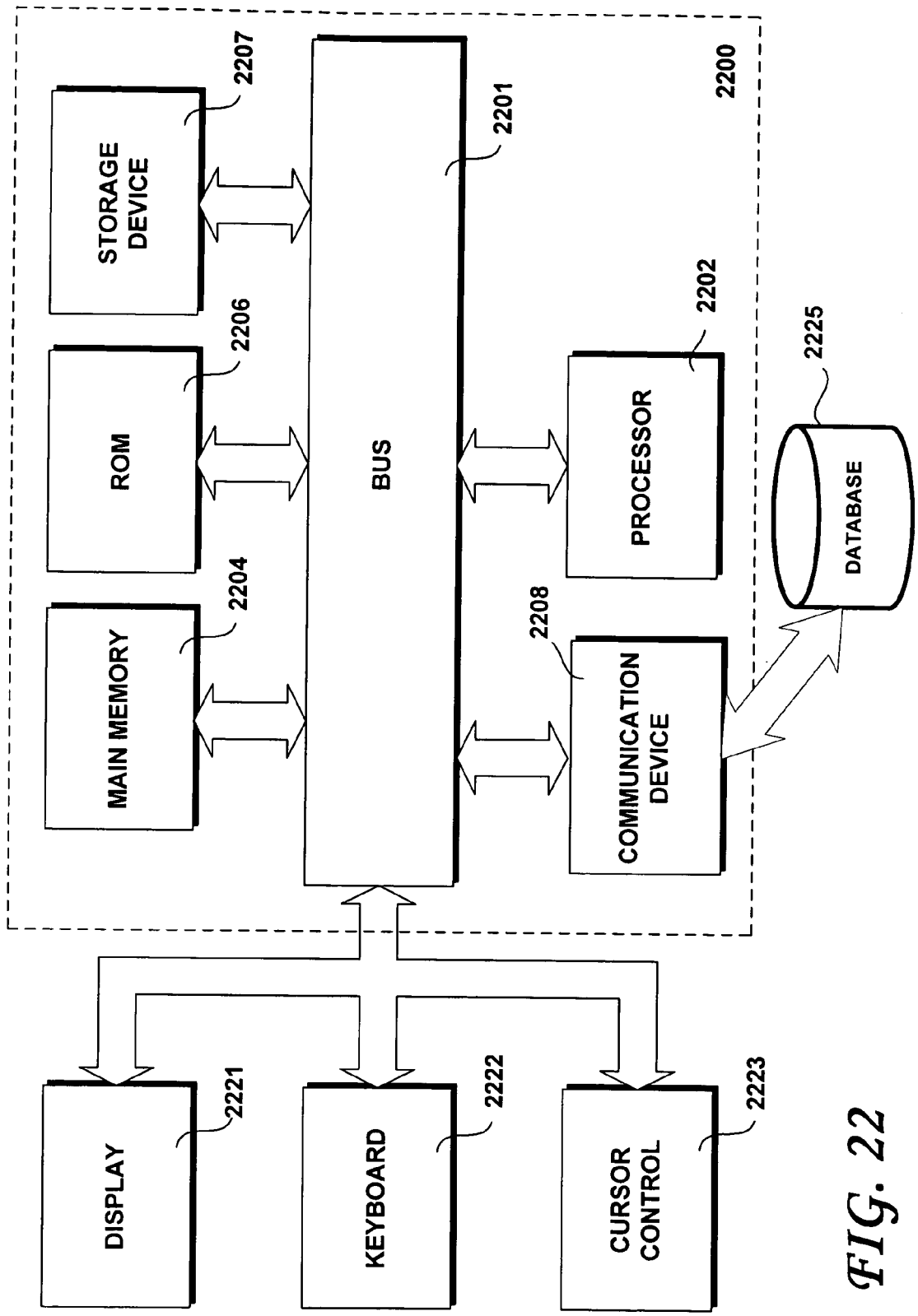
FIG. 22 is a block diagram of a computer with which embodiments of the present invention may be practiced.

FIG. 22 illustrates a block diagram of a computer system 2200 upon which embodiments of the present inventions may be implemented. Computer system 2200 includes a bus 2201 or other communication mechanism for communicating information, and one or more processors 2202 coupled with bus 2201 for processing information. Computer system 2200 further comprises a random access memory (RAM) or other dynamic storage device 2204 (referred to as main memory), coupled to bus 2201 for storing information and instructions to be executed by processor(s) 2202. Main memory 2204 also may be used for storing temporary variables or other intermediate information during execution of instructions by processor 2202. Computer system 2200 also includes a read only memory (ROM) and/or other static storage device 2206 coupled to bus 2201 for storing static information and instructions for processor 2202. A data storage device 2207, such as a magnetic disk or optical disk, is coupled to bus 2201 for storing information and instructions. The computer system 2200 may also be coupled via the bus 2201 to a display device 2221 for displaying information to a computer user. An alphanumeric input device 2222, including alphanumeric and other keys, is typically coupled to bus 2201 for communicating information and command selections to processor(s) 2202. Another type of user input device is cursor control 2223, such as a mouse, a trackball, or cursor direction keys for communicating direction information and command selections to processor 2202 and for controlling cursor movement on display 2221. The computer system 2220 may be coupled to a database 2225 configured to store the present management hierarchy and other information.

Embodiments of the present invention are related to the use of computer system 2200 and/or to a plurality of such computer systems to enable methods and systems for storing management hierarchies and for defining, creating and maintaining reports based upon embodiments of the present management hierarchy structure. According to one embodiment, the methods and systems described herein may be provided by one or more computer systems 2200 in response to processor(s) 2202 executing sequences of instructions contained in memory 2204. Such instructions may be read into memory 2204 from another computer-readable medium, such as data storage device 2207. Execution of the sequences of instructions contained in memory 2204 causes processor(s) 2202 to perform the steps and have the functionality described herein. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method of organizing, storing and representing human resource (HR) information and organizational responsibilities of an enterprise having a plurality of organizations, the method comprising:

receiving, at a computer system, wherein the computer system comprises at least one processor and at least one storage device, information defining a top node of a management hierarchy and storing in a memory associated with the computer system the information defining the top node, the top node representing a named operational manager for the enterprise as a whole;

receiving, at the computer system, information defining a responsibility for the enterprise as a whole and storing in the memory associated with the computer system information associating the responsibility for the enterprise as a whole with the named operational manager of the top node of the management hierarchy;

receiving, at the computer system, information defining a plurality of other nodes of the management hierarchy and storing in the memory associated with the computer system the information defining the plurality of nodes, each node in the plurality of nodes representing a named operational manager associated with at least one of the plurality of organizations within the enterprise, wherein each named operational manager reports to at least one other named operational manager such that at least one named operational manager is assigned to more than one responsibility or delegated responsibility or reports to a different named operational manager for each assigned responsibility or delegated responsibility;

receiving, at the computer system, information defining at least one responsibility for each of the plurality of organizations within the enterprise and storing in the memory associated with the computer system the information defining the at least one responsibility for each of the plurality of organizations for defined responsibilities;

receiving, at the computer system, information defining at least one delegated responsibility for each defined responsibility and storing in the memory associated with the computer system the information defining the at least one delegated responsibility for each defined responsibility for the define delegated responsibilities;

generating, with a processor associated with the computer system, information establishing a hierarchical position for each defined responsibility and delegated responsibility within the management hierarchy, such that each defined responsibility and each delegated responsibility except the responsibility for the enterprise as a whole reports to another defined responsibility or delegated responsibility of higher rank within the management hierarchy and storing in the memory associated with the computer system the information establishing the hierarchical position for each defined responsibility and delegated responsibility; and generating, with the processor associated with the computer system, information configured for displaying a graphical user interface for a report on a display device, the graphical user interface having a first menu configured to display a list of individuals obtained from the named operational managers in the management hierarchy, the graphical user interface further having a second menu configured to display a list of views over which to view data related to a selected individual from a perspective of a defined responsibility associated with a user of the graphical user interface, the graphical user interface further having a display area for data related to the selected individual including one or more selectable links to data corresponding to at least one individual having a defined responsibility that reports to the defined responsibility to which the selected individual is assigned in the management hierarchy.

2. The computer-implemented method of claim 1, further including the step of storing performance-related information and associating the stored performance-related information to at least one defined responsibility.

3. The computer-implemented method of claim 2, wherein the performance-related information includes sales data.

4. The computer-implemented method of claim 1, wherein the at least one operational manager that is assigned to more than one responsibility appears in the hierarchy once for each assigned responsibility.

5. The computer-implemented method of claim 1, wherein the report is selectively configurable to show:
   a selected responsibility and all hierarchically-lower responsibilities that report to the selected responsibility;
   a selected responsibility and all operational managers having responsibilities that report to the selected responsibility;
   a selected operational manager and all responsibilities that report to the responsibility to which the selected operational manager is assigned, and
   a selected operational manager and all operational managers having responsibilities that report to the responsibility to which the selected operational manager is assigned.

6. A computer system for organizing, storing and representing human resource (HR) information and organizational responsibilities of an enterprise having a plurality of organizations, the computer system comprising:
   at least one processor;
   at least one data storage device coupled to the at least one processor;
   a plurality of processes spawned by said at least one processor, the processes including processing logic for:
   defining a top node of a management hierarchy, the top node representing a named operational manager for the enterprise as a whole and storing information defining the top node;
   defining a responsibility for the enterprise as a whole and storing information associating the responsibility for the enterprise as a whole with the top node of the management hierarchy;
   defining a plurality of other nodes of the management hierarchy and storing information defining the plurality of nodes, each node in the plurality of nodes representing a named operational manager associated with at least one of the plurality of organizations within the enterprise, wherein each named operational manager reports to at least one other named operational manager such that at least one named operational manager is assigned to more than one responsibility or delegated responsibility or reports to a different named operational manager for each assigned responsibility or delegated responsibility; defining at least one responsibility for each of the plurality of organizations within the enterprise and storing information defining the at least one responsibility for each of the plurality of organizations the defined responsibilities;
   defining at least one delegated responsibility for each defined responsibility and storing information defining the at least one delegated responsibility for each defined responsibility the defined delegated responsibilities;
   generating information establishing a hierarchical position for each defined responsibility and delegated responsibility within the management hierarchy, such that each defined responsibility and each delegated responsibility except the responsibility for the enterprise as a whole reports to another defined responsibility or delegated responsibility of higher rank within the management hierarchy and storing the established hierarchical position for each defined responsibility and delegated responsibility; and
   generating information configured for displaying a graphical user interface for a report, the graphical user interface having a first menu configured to display a list of individuals obtained from the named operational managers in the management hierarchy, the graphical user interface further having a second menu configured to display a list of views over which to view data related to a selected individual from a perspective of a defined responsibility associated with a user of the graphical user interface, the graphical user interface further having a display area for data related to the selected individual including one or more selectable links to data corresponding to at least one individual having a defined responsibility that reports to the defined responsibility to which the selected individual is assigned in the management hierarchy.

7. The computer system of claim 6, further including the step of storing performance-related information and associating the stored performance-related information to at least one defined responsibility.

8. The computer system of claim 7, wherein the performance-related information includes sales data.

9. The computer system of claim 6, wherein the at least one operational manager that is assigned to more than one responsibility appears in the hierarchy once for each assigned responsibility.

10. The computer system of claim 6, wherein the report is selectively configurable to show:
   a selected responsibility and all hierarchically-lower-responsibilities that report to the selected responsibility;
   a selected responsibility and all operational managers having responsibilities that report to the selected responsibility;
   a selected operational manager and all responsibilities that report to the responsibility to which the selected operational manager is assigned, and
   a selected operational manager and all operational managers having responsibilities that report to the responsibility to which the selected operational manager is assigned.

11. A machine-readable storage medium having data stored thereon representing sequences of instructions which, when executed by a computing device, causes the computing device to organize, store and represent human resource (HR) information and organizational responsibilities of an enterprise having a plurality of organizations, the machine-readable storage medium comprising:
   instructions for defining a top node of a management hierarchy and storing information define the top node, the top node representing a named operational manager for the enterprise as a whole;
   instructions for defining a responsibility for the enterprise as a whole and storing information associating the responsibility for the enterprise as a whole with the top node of the management hierarchy;
   instructions for defining a plurality of other nodes of the management hierarchy and storing information defining the plurality of nodes, each node in the plurality of nodes representing a named operational manager associated with at least one of the plurality of organizations within the enterprise, wherein each named operational manager reports to at least one other named operational manager such that at least one named operational manager is assigned to more than one responsibility or delegated responsibility or reports to a different named operational manager for each assigned responsibility or delegated responsibility;
   instructions for defining at least one responsibility for each of the plurality of organizations within the enterprise and storing information defining the at least one responsibility for each of the plurality of organizations the defined responsibilities; instructions for defining at least one delegated responsibility for each defined responsibility and storing information defining the at least one delegated responsibility for each defined responsibility the defined delegated responsibilities;
   instructions for generating information establishing a hierarchical position for each defined responsibility and delegated responsibility within the management hierarchy, such that each defined responsibility and each delegated responsibility except the top node responsibility reports to another defined responsibility or delegated responsibility of higher rank within the management hierarchy and storing the established hierarchical position for each defined responsibility and delegated responsibility; and
   instructions for generating information configured for displaying a graphical user interface for a report, the graphical user interface having a first menu configured to display a list of individuals obtained from the named operational managers in the management hierarchy, the graphical user interface further having a second menu configured to display a list of views over which to view data related to a selected individual from a perspective of a defined responsibility associated with a user of the graphical user interface, the graphical user interface further having a display area for data related to the selected individual including one or more selectable links to data corresponding to at least one individual having a defined responsibility that reports to the defined responsibility to which the selected individual is assigned in the management hierarchy.

12. The machine-readable storage medium of claim 11, further including the step of storing performance-related information and associating the stored performance-related information to at least one defined responsibility.

13. The machine-readable storage medium of claim 12, wherein the performance-related information includes sales data.

14. The machine-readable storage medium of claim 11, wherein the at least one operational manager that is assigned to more than one responsibility appears in the hierarchy once for each assigned responsibility.

15. The machine-readable storage medium of claim 11, wherein the report is selectively configurable to show:
   a selected responsibility and all hierarchically-lower responsibilities that report to the selected responsibility;
   a selected responsibility and all operational managers having responsibilities that report to the selected responsibility;
   a selected operational manager and all responsibilities that report to the responsibility to which the selected operational manager is assigned, and
   a selected operational manager and all operational managers having responsibilities that report to the responsibility to which the selected operational manager is assigned.

* * * * *